US012608742B2

(12) United States Patent
Jo et al.

(10) Patent No.: US 12,608,742 B2
(45) Date of Patent: Apr. 21, 2026

(54) POWER TRANSACTION SYSTEM AND PROGRAM

(71) Applicant: HITACHI, LTD., Tokyo (JP)

(72) Inventors: Mingyu Jo, Tokyo (JP); Yoshikazu Ishii, Tokyo (JP); Nao Saito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 157 days.

(21) Appl. No.: 18/561,779

(22) PCT Filed: Mar. 14, 2022

(86) PCT No.: PCT/JP2022/011267
§ 371 (c)(1),
(2) Date: Nov. 17, 2023

(87) PCT Pub. No.: WO2022/244417
PCT Pub. Date: Nov. 24, 2022

(65) Prior Publication Data
US 2024/0221066 A1 Jul. 4, 2024

(30) Foreign Application Priority Data
May 17, 2021 (JP) ................................ 2021-083021

(51) Int. Cl.
*G06Q 30/00* (2023.01)
*G06Q 30/08* (2012.01)
*G06Q 50/06* (2012.01)

(52) U.S. Cl.
CPC ............. *G06Q 30/08* (2013.01); *G06Q 50/06* (2013.01)

(58) Field of Classification Search
CPC ................................................ G06Q 30/06–08
See application file for complete search history.

(56) References Cited

U.S. PATENT DOCUMENTS 7,249,027 B1 * 7/2007 Ausubel ................. G06Q 40/04 705/37
2012/0205977 A1 * 8/2012 Shin ....................... G06Q 30/06 307/26

(Continued)

FOREIGN PATENT DOCUMENTS

JP 2016-033801 A 3/2016
JP 2020-071776 A 5/2020

(Continued)

OTHER PUBLICATIONS

International Search Report, mailed Jun. 14, 2022, for International Application No. PCT/JP2022/011267.

(Continued)

*Primary Examiner* — Ethan D Civan
(74) *Attorney, Agent, or Firm* — Baker Botts L.L.P

(57) ABSTRACT

A power trading system includes: a matching-related data acquiring unit that acquires demand bid information and supply bid information, the demand bid information and the supply bid information each being given a priority level; an appearance rate prediction unit that obtains a predicted appearance rate of the demand bid information and that of the supply bid information; an agreement rate prediction unit that obtains a predicted agreement rate of the demand bid information and that of the supply bid information; and a matching unit that matches the demand bid information to the supply bid information while switching a priority level, based on the predicted appearance rate and the predicted agreement rate.

6 Claims, 10 Drawing Sheets

(56) References Cited

U.S. PATENT DOCUMENTS

| | | | | |
|---|---|---|---|---|
| 2015/0309549 | A1 | 10/2015 | Okabe | |
| 2017/0039633 | A1 * | 2/2017 | Yenisetty | G06Q 30/0275 |
| 2018/0025423 | A1 | 1/2018 | Utsumi et al. | |
| 2019/0139159 | A1 * | 5/2019 | Sarker | G06Q 30/08 |

FOREIGN PATENT DOCUMENTS

| | | | | |
|---|---|---|---|---|
| JP | 2021-056666 | A | | 4/2021 |
| JP | 2021069214 | A | * | 4/2021 |
| WO | WO 2021/053871 | A1 | | 3/2021 |

OTHER PUBLICATIONS

Written Opinion, mailed Jun. 14, 2022, for International Application No. PCT/JP2022/011267 (without English translation).

Extended European Search Report, mailed May 8, 2025, for European Application No. 22804336.0.

* cited by examiner

*FIG. 4*

| DEMAND BID ID | DEMAND BID INDIVIDUAL ID | PURCHASE-INTENDED POWER DATE | PURCHASE-INTENDED POWER TYPE | PURCHASE-INTENDED POWER (kW) | PURCHASE-INTENDED POWER VOLUME (kWh) | PURCHASE-INTENDED PRICE (¥) | BLOCK BID INTENTION | PURCHASE-INTENDED POWER POINT | PRIORITY LEVEL |
|---|---|---|---|---|---|---|---|---|---|
| 0000 | 0000–00 | FROM 11:00 TO 11: 30 ON JUNE 21, 2021 | RENEWABLE ENERGY | 50 | 25 | 3 | ○ | IBARAKI | 1 |
| 0000 | 0000–01 | FROM 11:00 TO 11: 30 ON JUNE 21, 2021 | RENEWABLE ENERGY | 55 | 25 | 3 | ○ | IBARAKI | 2 |
| 0000 | 0000–02 | FROM 11:00 TO 11: 30 ON JUNE 21, 2021 | NON-RENEWABLE ENERGY | 45 | 25 | 2 | × | CHIBA | 3 |
| 0000 | 0000–03 | FROM 11:00 TO 11: 30 ON JUNE 21, 2021 | RENEWABLE ENERGY | 40 | 25 | 2 | ○ | SAITAMA | 4 |

FIG. 6

| SUPPLY BID ID | SUPPLY BID INDIVIDUAL ID | SALES-INTENDED POWER DATE | SALES-INTENDED POWER TYPE | SALES-INTENDED POWER (kW) | SALES-INTENDED POWER VOLUME (kWh) | SALES-INTENDED PRICE (¥) | BLOCK BID INTENTION | SUPPLY POWER POINT | PRIORITY LEVEL |
|---|---|---|---|---|---|---|---|---|---|
| 0000 | 0000-00 | FROM 11:00 TO 11:30 ON JUNE 21, 2021 | RENEWABLE ENERGY | 50 | 25 | 3 | ○ | IBARAKI | 1 |
| 0000 | 0000-01 | FROM 11:00 TO 11:30 ON JUNE 21, 2021 | RENEWABLE ENERGY | 55 | 25 | 3 | ○ | IBARAKI | 2 |
| 0000 | 0000-02 | FROM 11:00 TO 11:30 ON JUNE 21, 2021 | NON-RENEWABLE ENERGY | 45 | 25 | 2 | × | CHIBA | 3 |
| 0000 | 0000-03 | FROM 11:00 TO 11:30 ON JUNE 21, 2021 | RENEWABLE ENERGY | 40 | 25 | 2 | ○ | SAITAMA | 4 |

POWER TRANSACTION SYSTEM AND PROGRAM

TECHNICAL FIELD

The present invention relates to a power trading system and a program.

BACKGROUND ART

In addition to conventional centralized power supplies, such as thermal power generation plants, decentralized power supplies are also becoming widespread. Decentralized power supplies include various types of systems, such as solar power generation plants as power generation systems, cogeneration systems, storage batteries as power storage systems, and heat pumps. Meanwhile, the power demand side is taking a new action called RE100 Action, which requires that the entire consumption power be generated from renewable energy. Because renewable energy available is not sufficient yet, RE50 Action, which requires that 50% of consumption power be generated from renewable energy, is also under discussion. A ratio at which a portion of consumption power is generated from renewable energy is referred to as an RE ratio. An RE ratio required by the demand side is not uniform but is expected to vary depending on the demand side's needs.

The supply side, which generates or stores power, and the demand side trade power via a power trading system. As existing power trading systems, such as Japan Election Power exchange (JEPX), are used for power trading, a power trading system that transacts local power trading has emerged in Europe. It is thus necessary that not only the existing power trading systems but also a new form of power trading system be studied.

The existing power trading system trades both renewable-energy-based power and non-renewable-energy-based power without making distinction between them in terms of power type. In power trading, the system does not sufficiently take into account the power supply capacity of storage batteries or the like, either. In many cases, a trading unit is determined to be 30 minutes or so. Such a power trading system trades power as a single standard type of power and is therefore able to do an efficient trade, but is facing a problem that the system cannot meet the entire needs from the power demand side and the power supply side.

Now power trading needs from both the supply side and the demand side will be considered. When a power generation facility of the supply side is a cogeneration system, the cogeneration system put in rated load operation is the most efficient way. In this case, selling power in blocks is a better approach, the blocks each defined as a block of a certain time and an amount of power. When it is decided that a given portion of power making up a block is set aside for self-consumption, selling power in blocks of irregular shapes is a better approach.

In the case of renewable energy, actual power output may turn out to be different from predicted power output. It is therefore difficult to supply power stably to the power demand side. The demand side has a need for stable supply of renewable energy, and has another need for supply of renewable energy that is clean and inexpensive and that is acceptable even if power output turns out to be unpredictable because surplus power from renewable energy could be used for other purposes, such as hydrogen production. To meet such various needs, it is desirable to allow trading under various matching conditions. Various needs from the supply side and the demand side appear as various conditions in trading. Various matching conditions presented by the supply side and the demand side include a power type and trading intended conditions. It is assumed that a discriminatory pricing method is adopted as a trading form.

PTL 1 discloses a power trading apparatus including an agreement rate determining means that determines an agreement rate that is a rate of agreements made by a power-selling side or a power-purchasing side, the apparatus being provided as a power trading apparatus that offers numbers of users trading opportunities.

CITATION LIST

Patent Literature

PTL 1: JP 2020-71776 A

SUMMARY OF INVENTION

Technical Problem

However, PTL 1 does not contain description of trading that reflects various needs from the demand side and the supply side.

When plenty of bids meeting matching conditions between the demand side and the supply side are constantly present on a trading system, matching is carried out using bid prices and bid volumes as main parameters of the trading system. However, if matching conditions are diversified, bid volumes become insufficient. In such a situation, a case of a bid meeting the matching condition being constantly not present is assumed to happen. A case where fewer demand sides or supply sides join trading on the trading system will lead to the same situation.

An object of the present invention is to provide a power trading system that allows proper power trading.

Solution to Problem

In order to solve the above problem, an aspect of the present invention provides a power trading system including: a matching-related data acquiring unit that acquires demand bid information and supply bid information, the demand bid information and the supply bid information each being given a priority level; an appearance rate prediction unit that obtains a predicted appearance rate of the demand bid information and that of the supply bid information; an agreement rate prediction unit that obtains a predicted agreement rate of the demand bid information and that of the supply bid information; and a matching unit that matches the demand bid information to the supply bid information while switching a priority level, based on the predicted appearance rate and the predicted agreement rate.

Advantageous Effects of Invention

According to the present invention, a power trading system that allows proper power trading can be provided.

Problems, configurations, and effects that are not described above will be made clear by the following description of embodiments.

BRIEF DESCRIPTION OF DRAWINGS

FIG. 4 depicts an example of demand bid information used in the power trading system according to the first embodiment of the present invention.

FIG. 6 depicts an example of supply bid information used in the power trading system according to the first embodiment of the present invention.

DESCRIPTION OF EMBODIMENTS

A plurality of embodiments of the present invention will hereinafter be described.

First Embodiment

Figure 1:
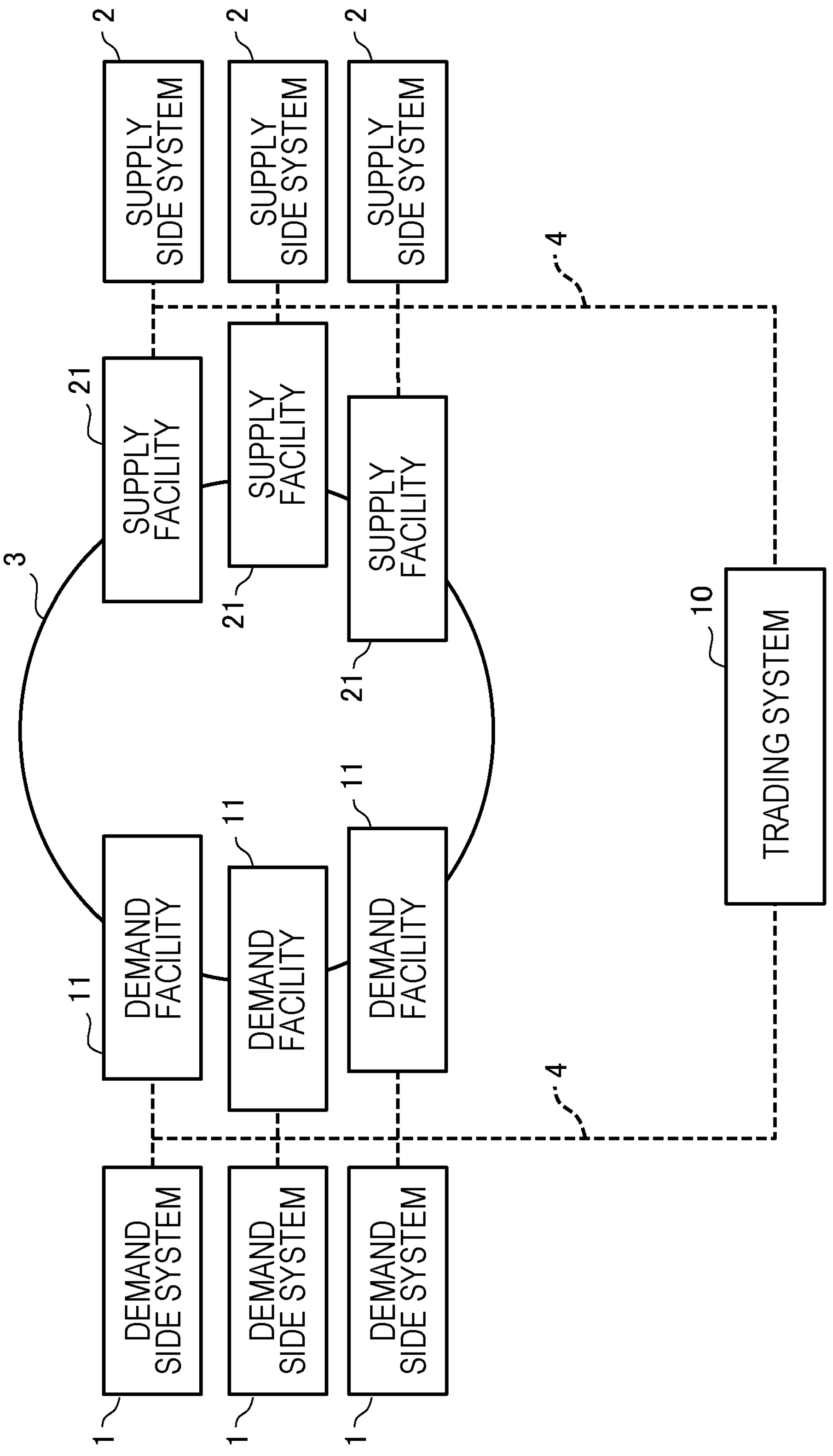
FIG. 1 is a configuration diagram of a system including a power trading system according to a first embodiment of the present invention.

FIG. 1 is a configuration diagram of a system including a power trading system according to a first embodiment. In this system, a power trading system 10 includes demand side systems 1, which represent a power demand side, and with demand facilities 11, which are facilities of the demand side systems 1. The power trading system 10 further includes supply side systems 2, which represents a power supply side, and with supply facilities 21, which are facilities of the supply side systems 2. Each demand facility 11 and each supply facility 21 are interconnected via a power supply line 3.

The demand side systems 1 and the supply side systems 2 are connected to the power trading system 10 via a communication network 4. The demand side systems 1 and the supply side systems 2 are connected to the demand facilities 11 and the supply facilities 21, respectively, via the communication network 4. The power trading system 10 may be connected to the demand facilities 11 and the supply facilities 21 via the communication network 4. The demand side system 1 acquires demand information, such as a power consumption volume, from the demand facility 11, and creates demand bid information for trading power on the power trading system 10. The supply side system 2 acquires supply information, such as a power generation volume, from the supply facility 21, and creates supply bid information for trading power on the power trading system 10. The power trading system 10 is a system that acquires demand bid information and supply bid information and that matches demand and supply.

Figure 2:
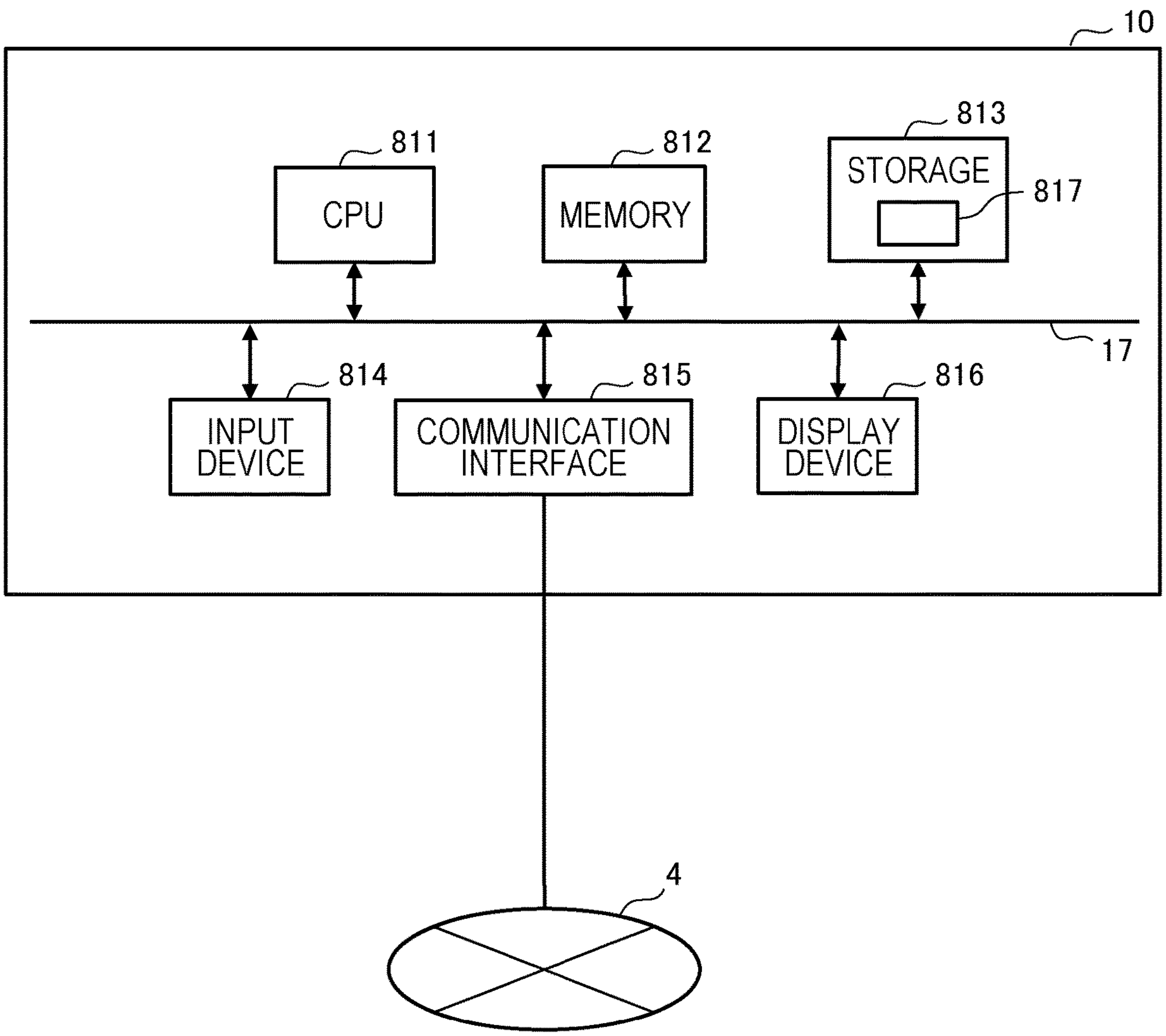
FIG. 2 is a hardware configuration diagram of the power trading system according to the first embodiment of the present invention.

FIG. 2 is a hardware configuration diagram of the power trading system 10. Functions of the power trading system 10 are implemented by a computer, such as a general-purpose computer or a server, and its peripheral equipment. As shown in FIG. 2, the power trading system 10 includes, as its hardware configuration, a central processing unit (CPU) 811, a memory 812, a storage 813, an input device 814, a communication interface 815, and a display device 816. The CPU 811 executes a given arithmetic operation, based on a program stored in the memory 812 or the storage 813. The memory 812 includes a random access memory (RAM) that temporarily stores data. As the storage 813, for example, a hard disk drive (HDD) or a solid state drive (SSD) is used.

A program 817 is set in the storage 813, and the power trading system 10 executes various processes described below, based on the program 817.

The input device 814 is operated by a user to input data. As such an input device 814, a keyboard, a mouse, a touch panel, or the like is used. As the input device 814, a keyboard or a mouse of a management personal computer may be used. The communication interface 815 performs data conversion based on a given protocol when data is exchanged between the power trading system 10 and the demand side system 1, the supply side system 2, the demand facility 11, and the supply facility 21 via the communication network 4.

The communication interface 815 communicates with an external device via the communication network 4.

The display device 816 is, for example, a liquid crystal display, and displays calculation results from the CPU 811 and the like. A display of the management personal computer may be used as the display device 816. The power trading system 10 may be configured as a single device (server or the like) or as a system composed of a plurality of devices (not illustrated) interconnected in a given manner via a communication line or a network.

Figure 3:
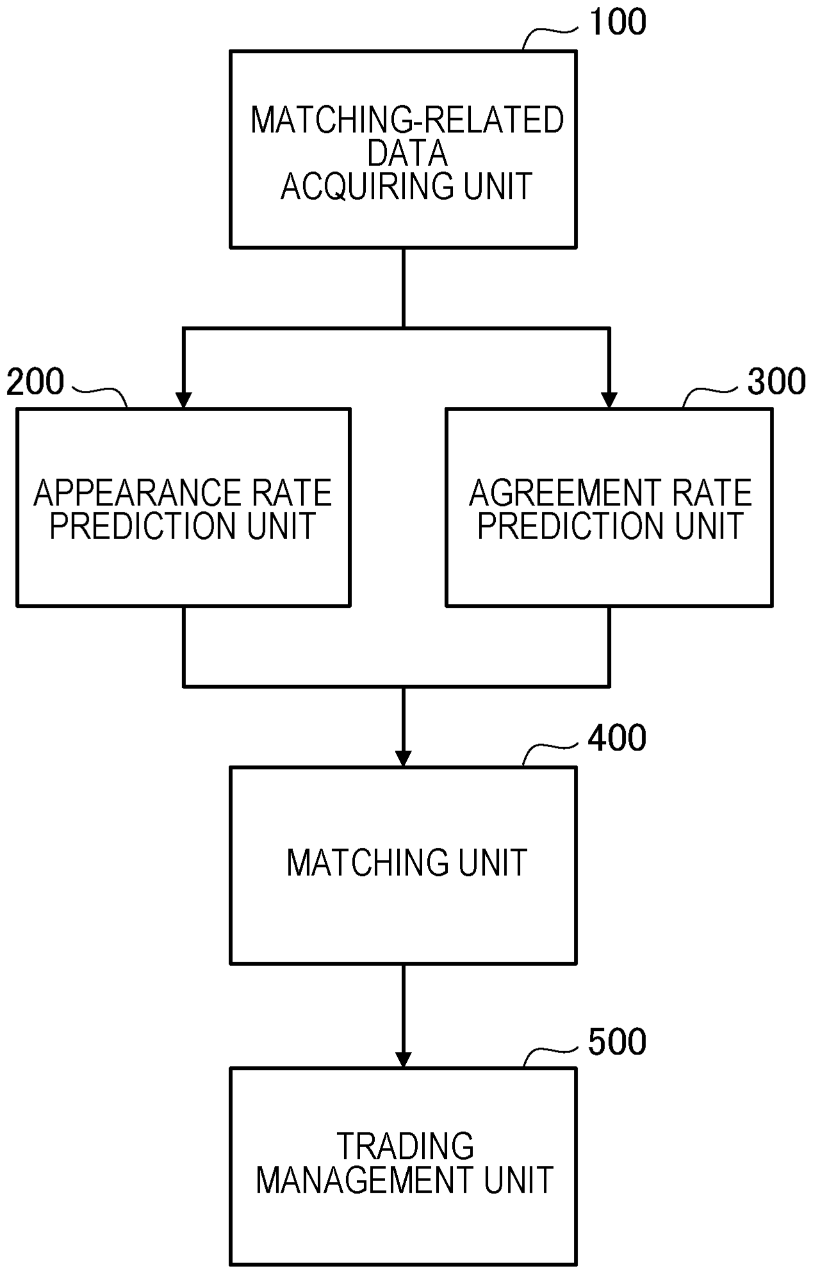
FIG. 3 is a functional block diagram of the power trading system according to the first embodiment of the present invention.

FIG. 3 is a functional block diagram of the power trading system 10. The power trading system 10 includes a matching-related data acquiring unit 100, an appearance rate prediction unit 200, an agreement rate prediction unit 300, a matching unit 400, and a trading management unit 500, which are functional units. The matching-related data acquiring unit 100 acquires matching-related data, the appearance rate prediction unit 200 and the agreement rate prediction unit 300 predict an appearance rate and an agreement rate, respectively, and based on the predicted appearance rate and agreement rate, the matching unit 400 matches demand bidding and supply bidding. A matching result from the matching unit 400 is managed by the trading management unit 500.

Matching-Related Data Acquiring Unit

The matching-related data acquiring unit 100 acquires data including demand bid information, supply bid information, a weather forecast, and a past matching history. The demand bid information and the supply bid information may be collectively referred to as bid information.

The demand bid information is information including matching conditions on the power demand side, and includes information on a demand bid ID, a demand bid individual ID, a purchase-intended power date, a purchase-intended power type, purchase-intended power (kW), a purchase-intended power volume (kWh), a purchase-intended price, a block bid intention, a purchase-intended power point, and a priority level. FIG. 4 depicts an example of the demand bid information.

The demand bid ID is an identification for the demand bid information, and is automatically given to the demand bid information by the power trading system 10.

The demand bid individual ID is each identification assigned to the same demand bid ID for each of a plurality of matching conditions. One demand bid ID has a plurality of demand bid individual IDs, each one of which is used for matching.

The purchase-intended power date is information about when purchased power is to be used.

The purchase-intended power type is a selected type of power defined by the power trading system 10, which is one of classified type of energies, i.e., renewable energy, non-renewable energy, and the like. Renewable energy thus means power generated from renewable energy. Non-renewable energy does not mean power generated from renewable energy but means power generated by burning fossil fuel or the like. "Renewable energy" in this example may be expressed more specifically as, for example, "solar power generation", "wind power generation", etc.

The purchase-intended power is power the demand side intends to purchase, and the purchase-intended power volume is a volume of power the demand side intends to purchase. The purchase-intended power volume is matched to a power volume that is the product of the purchase-intended power and a time indicated as the purchase-intended power date.

The purchase-intended price is the price of the purchase-intended power or of the purchase-intended power volume. The block bid intention is information about whether or not to perform matching for each of divided blocks corresponding to demand bid individual IDs.

Figure 5:
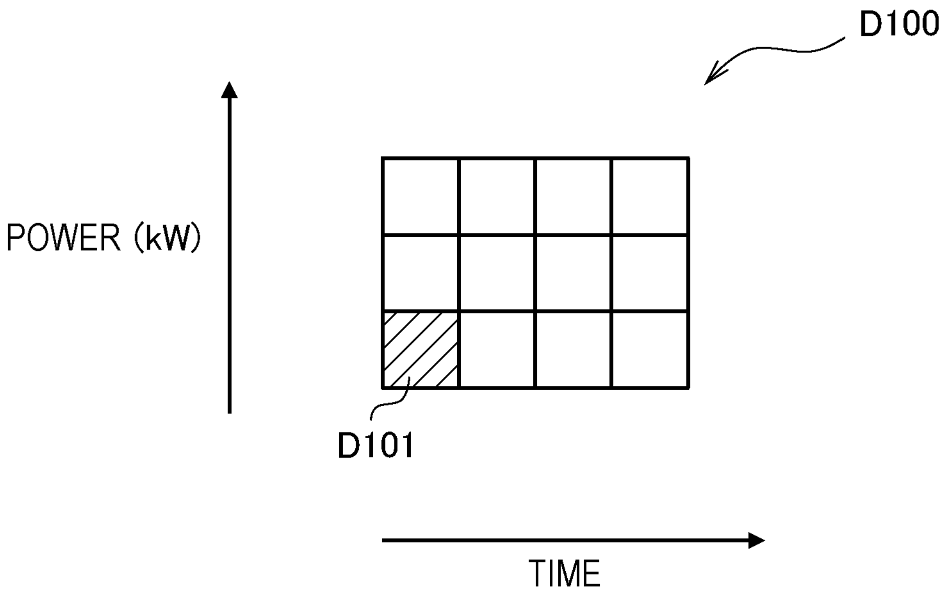
FIG. 5 depicts demand bid information plotted on a graph, the demand bid information being related to the power trading system according to the first embodiment of the present invention.

FIG. 5 depicts the demand bid information plotted on a graph. In the graph, the vertical axis represents power (kW) as the purchase-intended power volume (kWh), and the horizontal axis represents time. When making a bid using a demand bid ID (D100), the power demand side is allowed to make a bid for a divided block identified with a demand bid individual ID, such as a block D101. When the block bid intention is "x" in the demand bid information, the power demand side does not make a bid for a divided block. When the block bid intention is "O", the power demand side performs matching for each of divided blocks. The division is made in a way the power trading system 10 determines in advance. For example, respective lengths of the vertical and horizontal sides of the block D101 in FIG. 5 are determined to be standard lengths set by the power trading system 10.

The purchase-intended power point is information about where generated power is to be purchased. The purchase-intended power point is thus entered as the name or ID of a point determined by the power trading system 10. If which point is the purchase-intended power point is irrelevant, it is entered as "nationwide" or "any point".

The priority level represents a level of priority given to each of demand bid individual IDs appended to the same demand bid ID. The priority level is given in accordance with priority assignment rules set by the power trading system 10. For example, there may be a case where 1 represents the highest priority level and 2, 3, and 4 represent lower priority levels in increasing order.

The supply bid information (FIG. 6) is basically similar to the demand bid information. The supply bid information is information including matching conditions on the power supply side, and includes information on a supply bid ID, a supply bid individual ID, a sales-intended power date, a sales-intended power type, sales-intended power (kW), a sales-intended power volume (kWh), a sales-intended price, a block bid intention, a supply power point, and a priority level. FIG. 6 depicts an example of the supply bid information.

The supply bid ID is an identification for the supply bid information, and is automatically given to the supply bid information by the power trading system 10.

The supply bid individual ID is each identification assigned to the same supply bid ID for each of a plurality of matching conditions. One supply bid ID has a plurality of supply bid individual IDs, each one of which is used for matching.

The sales-intended power date is information about when sold power is to be used.

The sales-intended power type is a selected type of power defined by the power trading system 10, which is one of classified type of energies, i.e., renewable energy, non-renewable energy, and the like. Renewable energy thus means power generated from renewable energy. Non-renewable energy does not mean power generated from renewable energy but means power generated by burning fossil fuel or the like. "Renewable energy" in this example may be expressed more specifically as, for example, "solar power generation", "wind power generation", etc.

The sales-intended power is power the supply side intends to sell (power to be purchased), and the sales-intended power volume is a volume of power the supply side intends to sell. The sales-intended power volume is matched to a power volume that is the product of the sales-intended power and a time indicated as the sales-intended power date. The sales-intended price is the price of the sales-intended power or of the sales-intended power volume.

Figure 7:
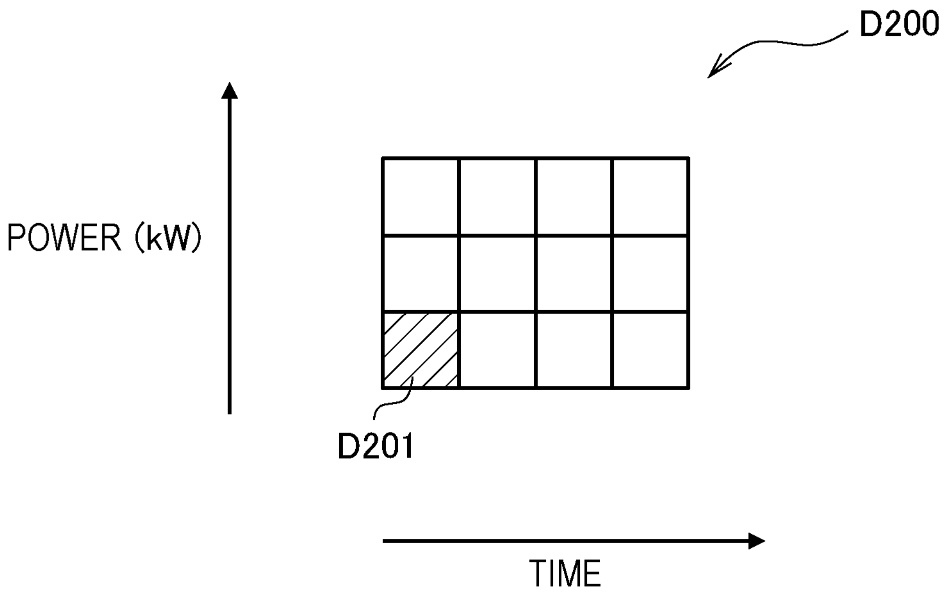
FIG. 7 depicts supply bid information plotted on a graph, the supply bid information being related to the power trading system according to the first embodiment of the present invention.

The block bid intention is information about whether or not to perform matching for each of divided blocks corresponding to sales bid individual IDs. FIG. 7 depicts the supply bid information plotted on a graph. In the graph, the vertical axis represents power (kW) as the sales-intended power volume (kWh), and the horizontal axis represents time. When making a bid using a supply bid ID (D200), the power demand side is allowed to make a bid for a divided block identified with a supply bid individual ID, such as a block D201. When the block bid intention is "x" in the supply bid information, the power supply side does not make a bid for a divided block. When the block bid intention is "O", the power demand side performs matching for each of divided blocks. The division is made in a way the power trading system 10 determines in advance. For example, respective lengths of the vertical and horizontal sides of the block D201 in FIG. 5 are determined to be standard lengths set by the power trading system 10.

The supply power point is information about where power has been generated. The purchase-intended power point is thus entered as the name or ID of a point determined by the power trading system 10.

The priority level represents a level of priority given to each of supply bid individual IDs appended to the same supply bid ID. The priority level is given in accordance with priority assignment rules set by the power trading system 10. For example, there may be a case where 1 represents the highest priority level and 2, 3, and 4 represent lower priority levels in increasing order.

The weather forecast is information including data on past weather forecast histories and future weather forecasts, providing weather information on individual points.

The past matching history is information including demand bid information, supply bid information, and matching history information that are used by the trading system in the past.

Appearance Rate Prediction Unit

The appearance rate prediction unit 200 obtains a predicted appearance rate for each piece of demand bid information and supply bid information. An appearance rate for demand bid information is a probability that the supply bid information corresponding to the demand bid information appears at each point of time. A predicted appearance rate for supply bid information is a probability that the demand bid information corresponding to the supply bid information appears at each point of time. For example, a probability that supply bid information matching demand bid information appears is calculated.

Figure 8:
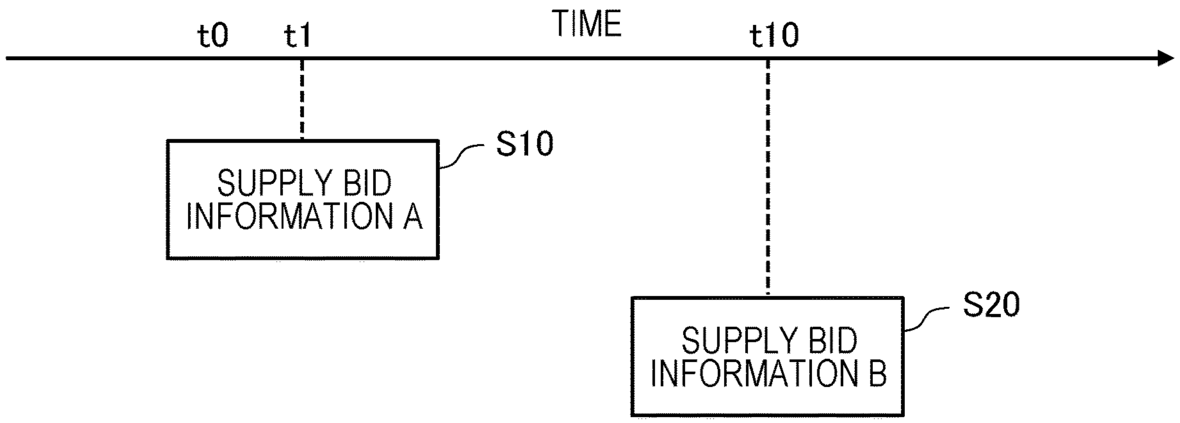
FIG. 8 depicts search results plotted along a time axis, the search results being related to the power trading system according to the first embodiment of the present invention.

The appearance rate is predicted by a method using a past matching history. For example, past supply bid information corresponding to demand bid information subjected to the prediction is searched for. FIG. 8 depicts search results plotted along a time axis. It is assumed that supply bid information A (S10) and supply bid information B (S20) are retrieved as the supply bid information corresponding to the demand bid information. It is assumed also that the supply bid information A appeared on the trading system at a point of time t1 and that the supply bid information B appeared on the trading system at a point of time t10. This means that the supply bid information appeared at t1 or t10 on some days out of the entire days Ttotal making up the past matching history. The predicted appearance rate can be calculated, for example, by the following formula.

"Predicted appearance rate $Zt$ at each point of time = $Tu/Ttotal$"

In this formula, Tu denotes a total of days on which the supply bid information corresponding to the demand bid information subjected to appearance rate prediction appeared at the above point of time.

When the supply bid information appears at the point of time t1 only on one day out of the entire days, the predicted appearance rate at the point of time t1 is calculated at 1/Ttotal. From t2 to t9, when matching the supply bid information ends up in a failure to leave unsuccessful bidding, the predicted appearance rate remains the same as the predicted appearance rate at the point of time t1. If the supply bid information A is matched at the point of time t2, on the other hand, the predicted appearance rate stands at 0 from the point of time t3 to the point of time t9. At the point of time t10, when matching the supply bid information ends up in a failure to leave unsuccessful bidding, the predicted appearance rate stands at 2/Ttotal. If the supply bid information A is matched at the point of time t2, however, the predicted appearance rate is 1/Ttotal.

The example in which Ttotal represents the entire days of the matching history on the trading system has been described. It is necessary, however, to consider seasonal factors when predicted appearance of demand bid information and supply bid information are determined. There may be a case, therefore, where a seasonal section is set and assigned based on the purchase-intended power date of demand bid information and then past demand bid information and supply bid information in the seasonal section are used. For example, seasonal sections are classified into a spring section, a summer section, an autumn section, and a winter section. These seasonal sections are defined such that the spring section ranges from May to March, the summer section ranges from June to August, the autumn section ranges from September to November, and the winter section ranges from December to February. According to such classified seasonal sections, demand bid information and supply bid information are used season by season. Hence the predicted appearance rate is calculated, using such information classified according to season categories. In addition to that, it is also assumed that demand on weekdays is different from demand on the weekend. There may also be a case, therefore, where, for each seasonal section, demand bid information and supply bid information are classified according to weekday categories and weekend categories. There may also be a case where demand bid information and supply bid information are classified according to weather categories.

Appearance rate prediction by statistical processing has been described above. A method of the prediction, however, is not limited to a statistical method. The appearance rate may be predicted also by a method using a neural network. For example, past appearance rates are calculated using demand bid information and supply bid information. Using this data of the past appearance rate, a neural network is able to predict the appearance rate through a supervised learning process. Furthermore, using the above factors of seasons, weekdays, weekend, and weather as explanatory variables is expected to offer higher prediction accuracy. There may also be a case where, in addition to appearance rates recorded in the past matching history, a current appearance rate is obtained from demand bid information and supply bid information currently present on the trading system by the above methods, and the obtained appearance rate is used as an explanatory variable.

Agreement Rate Prediction Unit

The agreement rate prediction unit 300 obtains a predicted agreement rate of each piece of demand bid information and supply bid information. The predicted appearance rate is an index indicating whether a demand bid or a supply bid that can be matched is present at a certain point of time, whereas the predicted agreement rate is an index indicating what volume of power demand or power supply exists. The predicted agreement rate can be calculated, for example, by the following formula.

"Predicted agreement rate $Ct$ at each point of time = $Ni/Nj$"

In this formula, Nj denotes a total of pieces of demand bid information subjected to the prediction in the past and Ni denotes a total of pieces of supply bid information subjected to the prediction in the past. This formula applies to a case where the agreement rate of power demand is predicted. When the agreement rate of power supply is predicted, therefore, the reciprocal of Ni/Nj is the predicted agreement rate.

Prediction of predicted agreement rate is made in the same manner as prediction of predicted appearance rate. There may be a case where seasonal factors are set and demand bid information and supply bid information used for the agreement rate prediction are classified according to season categories. There may also be a case where demand bid information and supply bid information are classified according to weekday categories and weekend categories. There may also be a case where demand bid information and supply bid information are classified according to weather categories.

Appearance rate prediction by statistical processing has been described above. A method of the prediction, however, is not limited to a statistical method. The appearance rate may be predicted also by a method using a neural network. For example, past predicted agreement rates are calculated using demand bid information and supply bid information. Using this data of the past appearance rate, a neural network is able to predict the appearance rate through a supervised learning process. Furthermore, using the above factors of seasons, weekdays, weekend, and weather as explanatory variables is expected to offer higher prediction accuracy. There may also be a case where, in addition to agreement rates recorded in the past matching history, a current agreement rate is obtained from demand bid information and supply bid information currently present on the trading system by the above methods, and the obtained agreement rate is used as an explanatory variable.

Matching Unit

Figure 9:
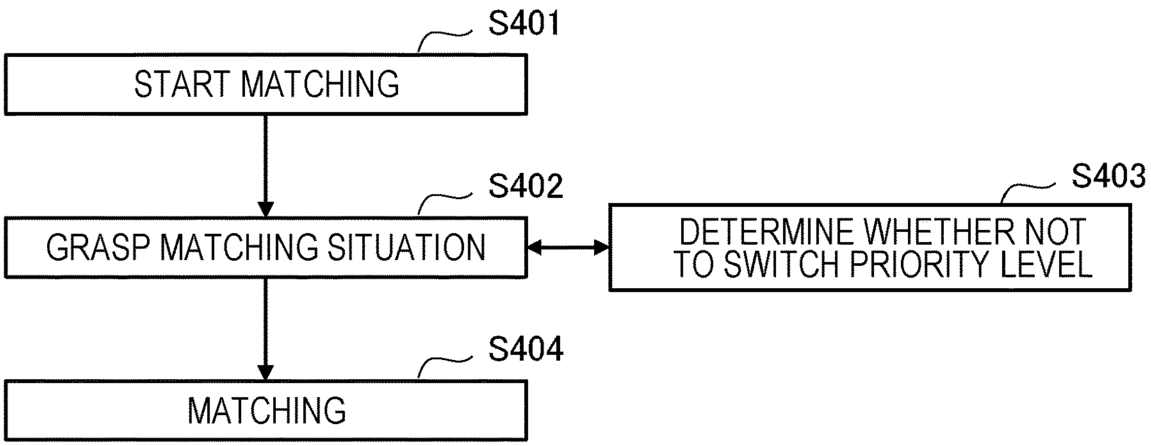
FIG. 9 is a flowchart showing a process by a matching unit of the power trading system according to the first embodiment of the present invention.

The matching unit 400 carries out matching of each piece of demand bid information and each piece of supply bid information. FIG. 9 is a flowchart showing a process by the matching unit.

In process S401, bids to be matched are presented on the power trading system 10 at the start of matching. Then, matching of demand bid information with a high priority level is tried first. In S402, to grasp a matching situation, whether a bid subjected to the matching has been matched successfully is determined. In S403, whether or not to switch a priority level for matching is determined, based on a predicted appearance rate and a predicted agreement rate calculated by the appearance rate prediction unit 200 and the agreement rate prediction unit 300, respectively. As a criterion for priority level switching, the product of the appearance rate and the agreement rate is calculated for each bid with a different priority level. When a situation where the matching is unsuccessful continues and the product of the appearance rate and the agreement rate for a bid with a given priority level becomes lower than the same for a bid with a priority level one rank lower than the given priority level, the bid with the priority level one rank lower than the given priority level may be subjected to the matching as a result of priority level switching. There may also be a case where a given period during which a state of matching failure continues is set and a bid with a given priority level is maintained in the set period.

In S404, demand bid information and supply bid information are matched. Demand bid information and supply bid information identical in content with each other are matched. When a plurality of pieces of demand bid information and supply bid information identical in content with each other are present, the matching is carried out, basically, according to first-come-first-out rules.

Trading Management Unit

The trading management unit 500 acquires a matching result from the matching unit 400, and updates demand bid information and supply bid information to be matched by the matching unit 400. The trading management unit 500 attaches a matching completion flag to demand bid information and supply bid information of which successful matching is indicated by the matching result, and removes the flagged information from demand bid information and supply bid information to be matched by the matching unit 400.

According to the power trading system 10 described above, by presenting a plurality of matching conditions in making one bid for power demand or power supply, demand bid information and supply bid information in the power trading system 10 can be increased, which facilitates the matching.

In addition, according to the power trading system 10, predicted appearance rates and predicted agreement rates are calculated for a plurality of bids with different priority levels, and priority levels for matching are switched based on calculated predicted appearance rates and predicted agreement rates. Thus, a bid with the highest priority level is matched first, and when the probability of successful matching becomes lower, a bid with a priority level second to the highest priority level is matched as a result of priority level switching.

Furthermore, according to the power trading system 10, predicted appearance rates and predicted agreement rates are calculated for a plurality of bids with different priority levels, and the same bidding is maintained in a given period. As a result, a bid with a high priority level can be maintained as long as possible.

Hence, according to the first embodiment, the power trading system 10 that allows proper power trading can be provided.

Second Embodiment

The following embodiments will be described, with, technical matters commonly included in the first embodiment omitted from the description.

In the first embodiment, giving a priority level to each bid has been described. Bid information represents a fixed value. In a second embodiment, the bid information does not represent a fixed value but is a bid information value having a set given range. For example, a case is assumed where the purchase-intended price of the demand bid information is set as a given range of price for each bid with a different priority level. When the purchase-intended price in the first embodiment is 100 yen, for example, this purchase-intended price is redefined by adding ±10% of 100 yen, as a purchase-intended price ranging from 90 yen to 110 yen. This process is applied to the supply bid information as well, which makes matching conditions lenient, thus increasing demand bid information or supply bid information corresponding to each bid.

Third Embodiment

Figure 10:
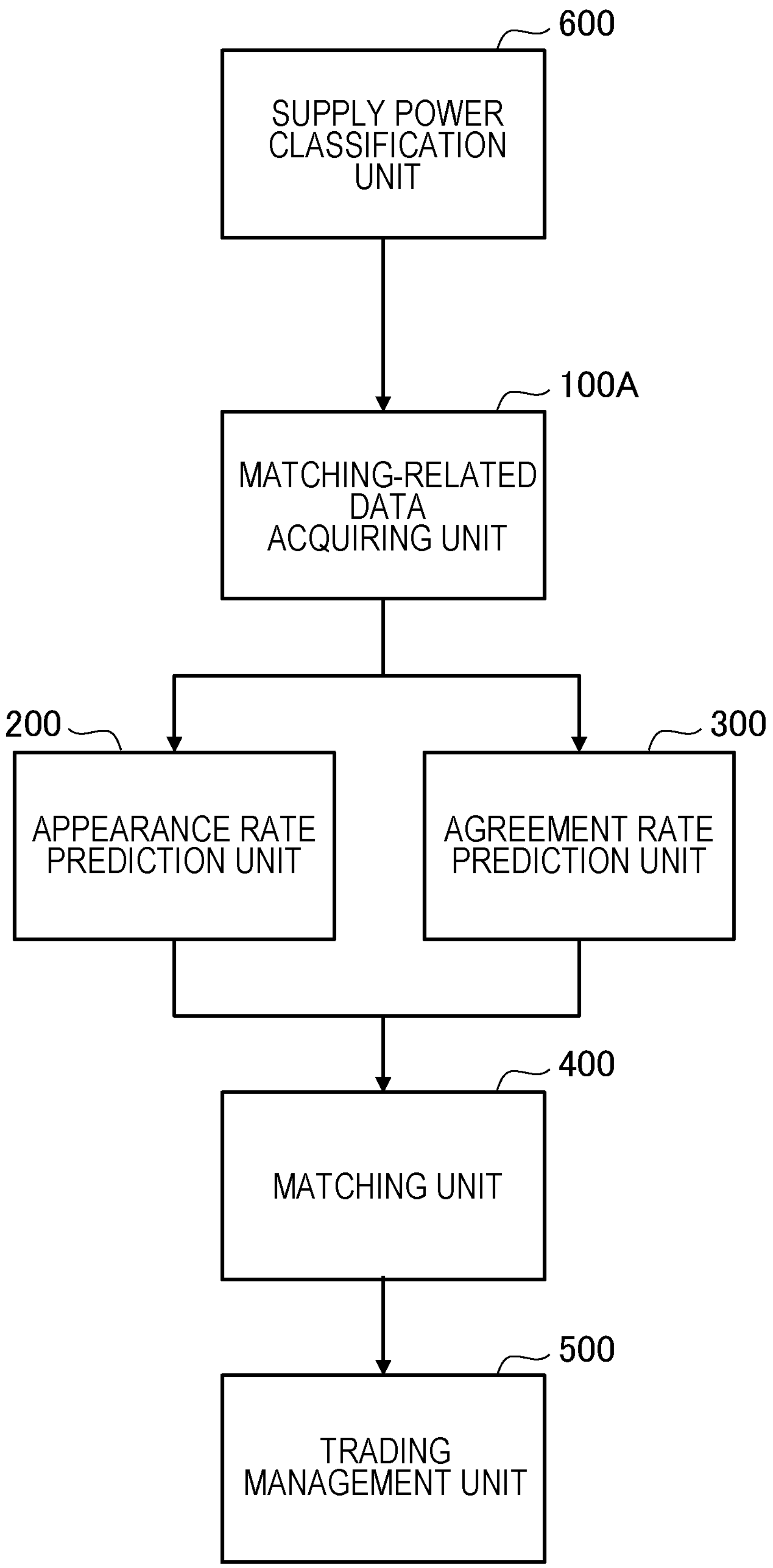
FIG. 10 is a functional block diagram of a power trading system according to a third embodiment of the present invention.

FIG. 10 is a functional block diagram of a power trading system 10 according to a third embodiment. In this functional block diagram, a supply power classification unit 600 is added to the functional block diagram of the first embodiment (FIG. 3), the supply power classification unit 600 collecting predicted value information on the supply side and classifying supply power into a renewable energy stable portion, a renewable energy fluctuation portion, a renewable energy charge/discharge capability, a renewable energy discharge capability, non-renewable energy, a non-renewable energy charge/discharge capability, and a non-renewable energy discharge capability.

In the first embodiment, it has been proposed that power types are classified into renewable-energy-based power and non-renewable-energy-based power that and renewable-energy-based power is further classified into solar power and wind power. However, power types may be classified from other points of view. For example, power types may be classified into a renewable energy stable portion, a renewable energy fluctuation portion, a renewable energy charge/discharge capability, a renewable energy discharge capability, non-renewable energy, a non-renewable energy charge/discharge capability, and a non-renewable energy discharge capability. Power generation from renewable energy often yields a power generation volume different from a predicted value, and therefore may lead to a case where a trade in power is made in advance but in fact, due to fluctuations in power output, an agreed volume of power cannot be provided. The renewable energy stable portion refers to a power generation volume as a volume of renewable-energy-based power that is highly likely to be provided, while the renewable energy fluctuation portion refers to a power generation volume as a volume of renewable-energy-based power that is less likely to be provided. According to this classification, a demand side who wants to secure a stable volume of renewable-energy-based power purchases the renewable energy stable portion, while a demand side who wants to purchase renewable-energy-based power at low cost even if its supply is unstable purchases the renewable energy fluctuation portion. The renewable energy charge/discharge capability and the non-renewable energy charge/discharge capability are capabilities of classifying chargeable/dischargeable power into renewable-energy-based power and non-renewable-energy-based power and charging storage batteries with power and discharging power therefrom. Because these capabilities utilize the ability of the storage batteries, power types defined as these capabilities are different from the renewable energy stable portion and the renewable energy fluctuation portion. These capabilities refer to capabilities to discharge renewable energy from the storage batteries in a certain time zone or to charge the storage batteries with renewable energy in a certain time zone. As described in the first embodiment, non-renewable-energy-based power is power generated from fossil fuel or the like.

The supply power classification unit 600 carries out a process of dividing a power generation volume of renewable-energy-based power into the renewable energy stable portion and the renewable energy fluctuation portion. One of methods of dividing the power generation volume of renewable-energy-base power into the renewable energy stable portion and the renewable energy fluctuation portion is a method using confidence intervals. A predicted value of renewable-energy-based power in a period in which the supply side wants to sell power is acquired from the supply side.

Figure 11:
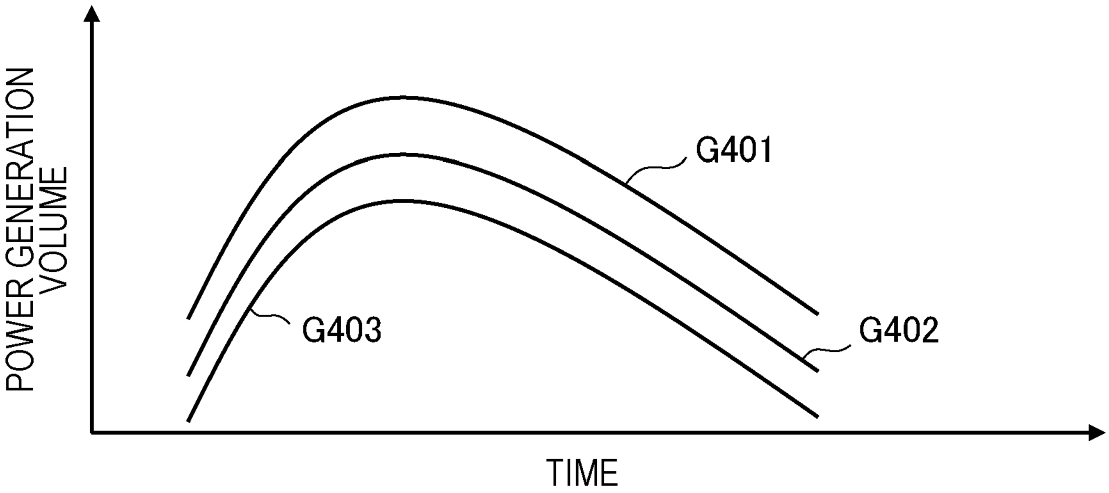
FIG. 11 is a graph showing an example of predicted values of renewable energy.

FIG. 11 is an example of predicted values of renewable-energy-based power. G402 is an average of the predicted values, and G401 and G403 are predicted values in a certain confidence interval. A confidence level is determined by using a prediction error given by comparing a past predicted value with an actual value. The power generation volume is divided into the renewable energy stable portion and the renewable energy fluctuation portion, based on a power output probability. A reference power output probability is set as any given value. For example, when G401 and G403 are normal distribution curves with 3σ (σ is a standard deviation) and a power generation volume equal to or lower than a power generation volume represented by G403 is a stable portion, the whole power generation volume is divided into the renewable energy stable portion and the renewable energy fluctuation portion, based on a reference power output probability of 99.7%.

In the case of the renewable energy stable portion and the renewable energy fluctuation portion, the matching-related data acquiring unit 100A acquires data of the sales-intended power date, sales-intended power type, sales-intended power, and sales-intended power volume of the supply bid information that are automatically entered processing results from the supply power classification unit 600. These values are updated when updating data on a predicted value of renewable-energy-based power is entered.

Basically, the predicted appearance rate and the predicted agreement rate are calculated in the same manner as in the first embodiment. When the renewable energy stable portion and the renewable energy fluctuation portion are updated by the supply power classification unit 600 and the matching-related data acquiring unit 100A, however, the predicted appearance rate and the predicted agreement rate, which are described in the first embodiment, are updated based on updated supply bid information.

According to the third embodiment, the power generation volume of renewable-energy-based power is divided by using the confidence interval, into the renewable energy stable portion with a high supply probability and the renewable energy fluctuation portion with a low supply probability, and matching is carried out accordingly.

Fourth Embodiment

In the first embodiment, there may be a case where demand bid information entries increases at a certain point of time. A case is assumed where, for example, a power consumption volume increases due to temperature changes, and, to procure necessary power, many demand sides seek power supply on the power trading system 10. Another case is also assumed where a lot of bids are made for a specific power type. There may also be a case where renewable-energy-based power is not generated due to unfavorable weather conditions and consequently supply bid information available for matching is not present on the power trading system 10.

In such a case, the renewable energy charge/discharge capability can be used. Specifically, as a matching condition for demand bid information, renewable energy charge/discharge capability availability information is added. When renewable energy charge/discharge capability availability information indicates the renewable energy charge/discharge capability is available, the matching unit 400 searches for a combination of supply bid information on the renewable energy stable portion or the renewable energy fluctuation portion in a time zone different from a purchase-intended time zone and the renewable energy charge/discharge capability and carries out matching before switching to a matching condition for a demand bid individual ID with a one-rank lower priority level. At this time, matching conditions except the purchase-intended power date need to match the combination. In the first embodiment, for example, it is necessary that the sum of a sales-intended price of the renewable energy fluctuation portion of the supply bid information and a sales-intended price of the renewable energy charge/discharge capability match a purchase-intended price. In the second embodiment, it is necessary that the sum of sales-intended prices be within a set range. The renewable energy stable portion or the renewable energy fluctuation portion is supplied as charged power, using the renewable energy charge/discharge capability. The charged power is then provided at the point of time indicated as the purchase-intended power date of demand bid information.

It should be noted that the present invention is not limited to the above embodiments but includes various modifications. For example, the above embodiments have been described in detail for easy understanding of the present invention, and is not necessarily limited to an embodiment including all constituent elements described above. Some constituent elements of a certain embodiment may be replaced with constituent elements of another embodiment, and a constituent element of another embodiment may be added to a constituent element of a certain embodiment. In addition, some of constituent elements of each embodiment can be deleted therefrom or add to or replaced with constituent elements of another embodiment.

Some or all of the above constituent elements, functional units, processing units, processing means, and the like may be provided as hardware, such as properly designed integrated circuits. In addition, the above constituent elements, functional units, and the like may be provided in the form of software-based programs by causing a processor to interpret and execute programs for implementing functions. Information for implementing functions, such as programs, tables, and files, may be stored in a storage device, such as a memory, a hard disk, and a solid state drive (SSD), or in a recording medium, such as an IC card, an SD card, and a DVD.

A group of control lines/information lines considered to be necessary for description are illustrated, and all control lines/information lines making up the product are not necessarily illustrated. It is safe to assume that, actually, almost the entire constituent elements are interconnected.

REFERENCE SIGNS LIST

10 power trading system
100, 100A matching-related data acquiring unit
200 appearance rate prediction unit
300 agreement rate prediction unit
400 matching unit
817 program

The invention claimed is:

1. A power trading system comprising:

a matching-related data acquirer that acquires demand bid information and supply bid information, the demand bid information and the supply bid information each being given a priority level;

an appearance rate predictor that obtains a predicted appearance rate of the demand bid information and a predicted appearance rate of the supply bid information;

an agreement rate predictor that obtains a predicted agreement rate of the demand bid information and a predicted agreement rate of the supply bid information; and a matcher that matches the demand bid information to the supply bid information while switching a priority level of the demand bid information based on a product of a predicted appearance rate of the demand bid information and a predicted agreement rate of the demand bid information, and while switching a priority of the supply bid information based on a product of a predicted appearance rate of the supply bid information and the predicted agreement rate of the supply bid information to provide power trading for a priority level that is less than the highest priority level when matching conditions are diversified in a power trading system.

2. The power trading system according to claim 1, wherein a range is set as a range within which a value of demand bid information and/or a value of supply bid information varies.

3. The power trading system according to claim 1, wherein supply power is classified into a renewable energy stable portion, a renewable energy fluctuation portion, a renewable energy charge/discharge capability, a renewable energy discharge capability, non-renewable energy, a non-renewable energy charge/discharge capability, and a non-renewable energy discharge capability, and for each of supply power categories, the appearance rate predictor and the agreement rate predictor calculate the predicted appearance rate and the predicted agreement rate, respectively.

4. The power trading system according to claim 3, wherein a confidence interval based on a predicted value and an actual value of renewable energy is calculated for the renewable energy stable portion and the renewable energy fluctuation portion, and in a case of a weather change, the predicted appearance rate and the predicted agreement rate are updated, using a confidence interval and a predicted value based on the changed weather.

5. The power trading system according to claim 3, wherein the matcher searches for a combination of a renewable energy stable portion or a renewable energy fluctuation portion and a renewable energy charge/discharge capability before switching to a matching condition with a one-rank lower priority level, and when the supply bid information and the demand bid information in accordance with the combination match, matches the demand bid information and the supply bid information to each other.

6. A program that causes a computer to execute a matching-related data acquirer that acquires demand bid information and supply bid information, the demand bid information and the supply bid information each being given a priority level;

an appearance rate predictor that obtains a predicted appearance rate of the demand bid information and a predicted appearance rate of the supply bid information;

an agreement rate predictor that obtains a predicted agreement rate of the demand bid information and a predicted agreement rate of the supply bid information; and a matcher that matches the demand bid information to the supply bid information while switching a priority level of the demand bid information based on a product of a predicted appearance rate of the demand bid information and a predicted agreement rate of the demand bid information, and while switching a priority of the supply bid information based on a product of a predicted appearance rate of the supply bid information and the predicted agreement rate of the supply bid information to provide power trading for a priority level that is less than the highest priority level when matching conditions are diversified in a power trading system.

* * * * *